Dec. 10, 1963
J. O. GAUMER
3,113,548
WATER CRAFT
Filed Sept. 22, 1961
3 Sheets-Sheet 1
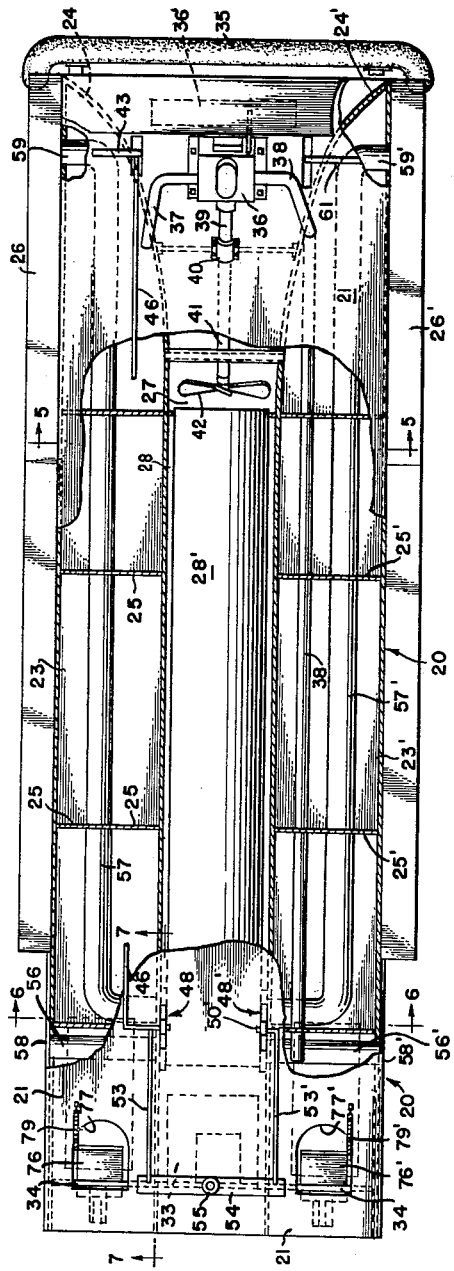
FIG. 1.
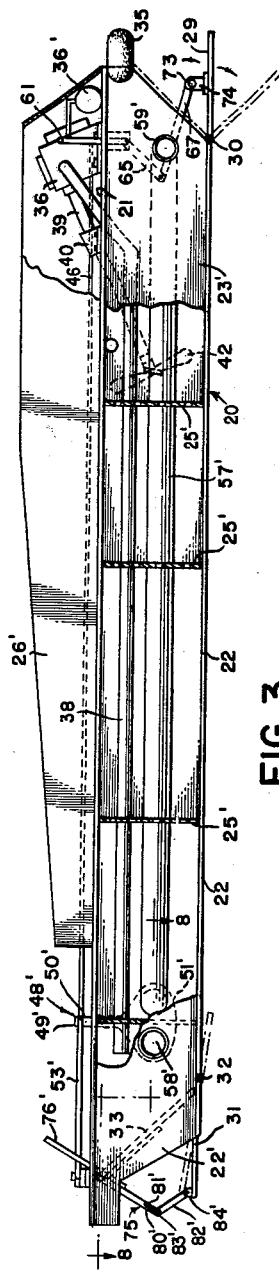
FIG. 2
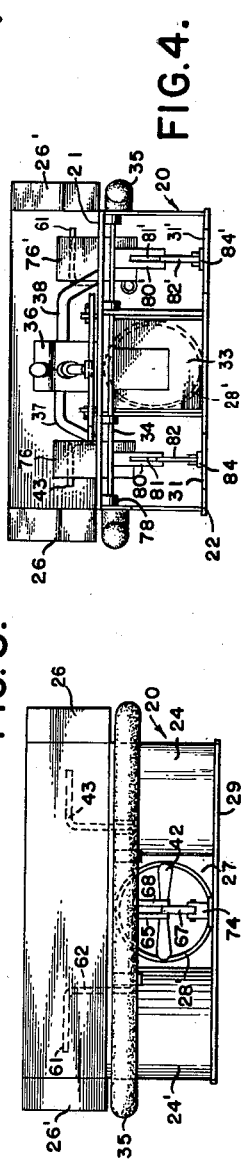
FIG. 4.
FIG. 3.
INVENTOR.
JOHN O. GAUMER
BY
Garvey & Garvey
ATTORNEYS Dec. 10, 1963 J. O. GAUMER 3,113,548
WATER CRAFT
Filed Sept. 22, 1961 3 Sheets-Sheet 2
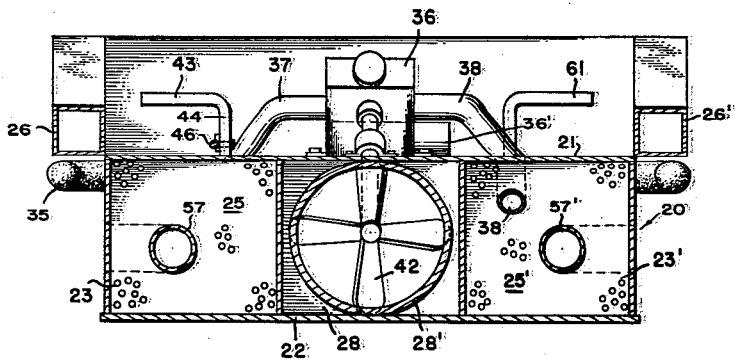
FIG. 5.
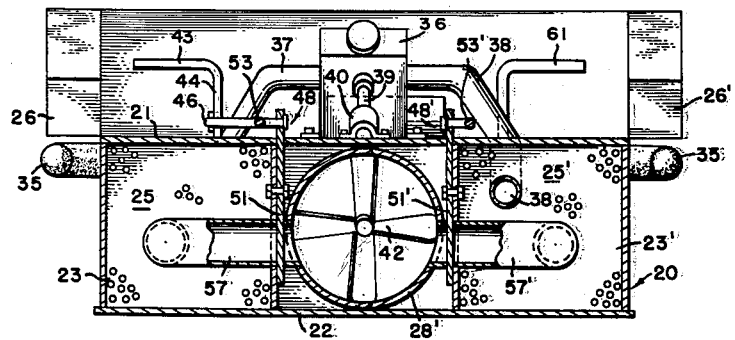
FIG. 6.
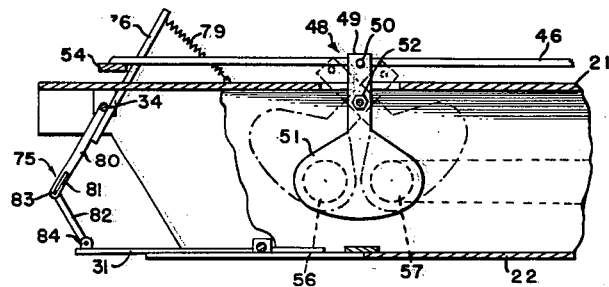
FIG. 7.
FIG. 14. FIG. 15. FIG. 16.
INVENTOR.
JOHN O. GAUMER
BY
Garvey + Garvey
ATTORNEYS

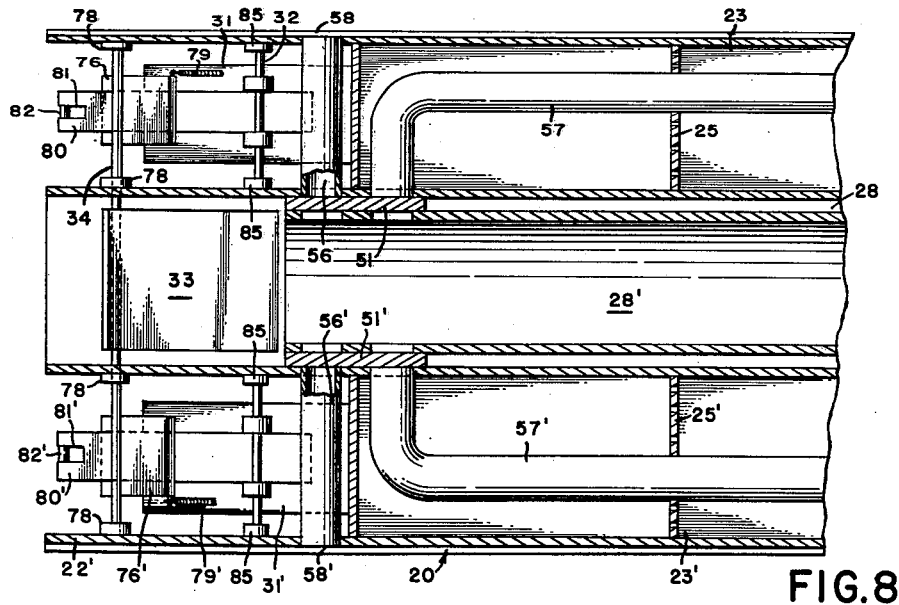
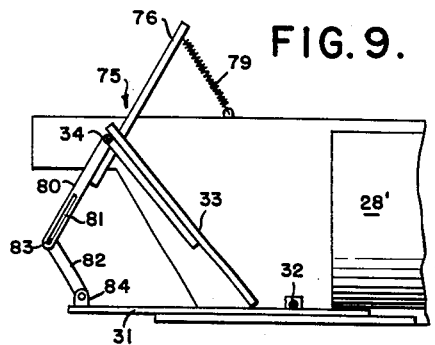
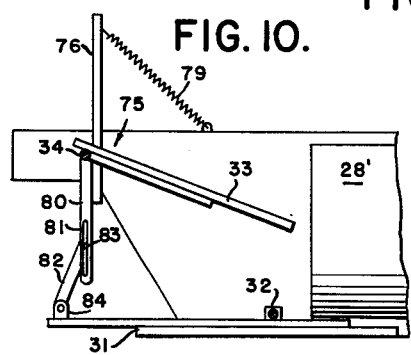
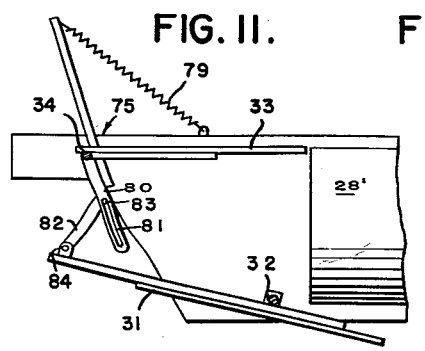
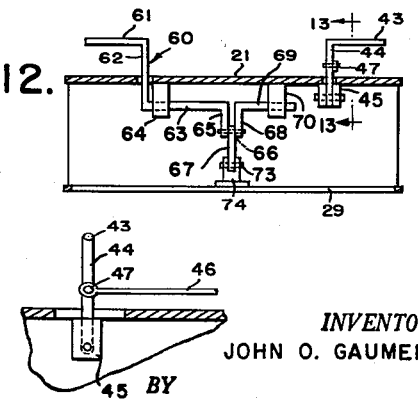

United States Patent Office 3,113,548
Patented Dec. 10, 1963

3,113,548
WATER CRAFT
John O. Gaumer, Rte. 1, Box 201, Oroville, Calif.
Filed Sept. 22, 1961, Ser. No. 139,970
5 Claims. (Cl. 115—12)

This invention relates to a water craft, and more particularly to a hydro-jet propelled surfboard for use as a water sport activity, and capable of carrying one or more riders, the surfboard being also adapted for other uses such as lifesaving.

It is an object of this invention to provide a hydro-jet propelled surfboard having a longitudinally extending water channel through which water is forced to produce forward motion of the surfboard.

Another object is to provide a hydro-jet propelled surfboard of the character described, including jet tube openings at the stern and bow on each side of the water channel, the water being selectively directed through the jet tube openings to effect turning of the surfboard.

A further object is to provide a surfboard having constant speed power means, the speed of the surfboard being controlled by adjustable door means in a tubular member positioned in the water channel, the door means regulating the flow of water through the water channel.

Other objects are to provide a surfboard equipped with fore and aft diving rudders maneuvered by the rider; to provide a surfboard having a central water channel and stabilizing air tanks on each side of the water channel, and to provide a surfboard of lightweight construction, having hand and foot levers operated by the rider to control speed and to effect turning and diving.

Other objects of the invention will be manifest from the following description of the invention, taken in connection with the accompanying drawings, wherein:

FIG. 1 is a top plan view of a water craft constructed in accordance with the present invention, portions thereof being removed to disclose details of construction;

FIG. 2 is a side elevational view of the same;

FIG. 3 is a front elevational view thereof;

FIG. 4 is a rear elevational view of the device of the present invention;

FIG. 5 is a sectional view taken along the line 5—5 of FIG. 1, looking in the direction of the arrows;

FIG. 6 is a sectional view taken along the line 6—6 of FIG. 1, looking in the direction of the arrows;

FIG. 7 is a sectional view taken along the line 7—7 of FIG. 1, looking in the direction of the arrows;

FIG. 8 is a sectional view taken along the line 8—8 of FIG. 2, looking in the direction of the arrows;

FIG. 9 is an enlarged fragmentary side elevational view of the stern of the water craft of the present invention, showing the channel door 33 in closed position;

FIG. 10 is a view similar to FIG. 9, showing the channel door in partially open position;

FIG. 11 is a view similar to FIG. 9, showing the channel door fully open and the stern diving rudder in operative position;

FIG. 12 is a front elevational view partly in section, of the hand control assembly for the bow diving and elevating rudder of the present invention;

FIG. 13 is a sectional view taken along the line 13—13 of FIG. 12, looking in the direction of the arrows;

FIG. 14 is a side elevational view, partly in section, of a portion of the hand control assembly for operating the bow diving rudder and showing the latter in open horizontal position;

FIG. 15 is a view similar to FIG. 14, showing in full lines the hand control assembly in position for moving the bow diving rudder to operative position, and showing in dotted lines the position of the hand control assembly for surfacing; and FIG. 16 is a view similar to FIG. 14, showing the hand control in position for positioning the bow rudder to elevate the craft.

Referring now in greater detail to the drawings, there is illustrated, a water craft or surfboard constructed in accordance with the present invention, including a hull generally designated 20, having a deck 21, and a flat bottom 22 in spaced relation to the deck. Between deck 21 and flat bottom 22, there are provided a pair of like air tanks 23 and 23' which extend longitudinally of the craft through a substantial portion of its length along the lateral extremities thereof. Siding for the remainder of the hull is indicated at 22'. Port and starboard air tanks 23 and 23' are gradually tapered toward the lateral extremities of the surfboard near the bow thereof, as indicated at 24 and 24'. Tanks 23 and 23' are preferably of square cross section and include a plurality of spaced, interior perforate walls 25, 25', the air tanks serving to stabilize the surfboard during operation. Above and outwardly of air tanks 23 and 23' are anti-roll stabilizers 26, 26' which are preferably of rectangular cross section, are substantially co-extensive with air tanks 23, 23' and taper downwardly from a point intermediate the length thereof to the aft end.

The space between the air tanks 23, 23' constitutes a water channel 27, the forward end of said water channel being flared outwardly by virtue of the tapered sections 24, 24' of air tanks 23, 23'. Within water channel 27, at a point spaced from the bow of the craft, is a central air tank 28 extending to the stern of the surfboard, in which is positioned a water channel tube 28'. Water channel tube 28' is open at both ends and may be fixed in position in any suitable manner.

A combination water channel elevating and diving rudder 29 is pivoted at 30 to the leading edge of bottom 22 and spaced diving rudders 31 are fixed to a transverse pivot bar 32 near the aft edge of bottom 22. A water channel closing gate or door 33 is pivoted to a transverse bar 34 (FIG. 1) near the upper limit of the stern or the hull. A bow bumper unit is indicated at 35.

The surfboard of the present invention is powered by any suitable marine engine 36 including a fuel tank 36' mounted above water channel 27 and having an air inlet 37 in communication with air tank 23. Air inlet 37 takes air from port air tank 23 when the craft is caused to dive under water. An exhaust pipe 38 extends rearwardly through air tank 23' to the aft end of the hull where the exhaust gases are expelled. A drive shaft 39 extends from motor 36 and is connected at 40 to a propeller shaft 41. A propeller 42 is fixed to the free terminal of propeller shaft 41 and is positioned at the mouth of the forward terminal of tubular member 28'. By this arrangement, the water in channel 27 is forced through tubular member 28' at increased velocity, producing a jet effect and resultant forward motion of the craft.

The direction of movement of the surfboard of the present invention is controlled independently of the engine 36. The directional assembly includes a hand hold 43 adapted to be manipulated in a fore and aft direction by the rider. As shown in FIG. 13, hand hold 43 is pivotally connected by a lever 44 to a suitable bearing member 45. A push rod 46 is pivoted to lever 44 at a point intermediate its length, as indicated at 47. Push rod 46 extends rearwardly of the surfboard through air tank 23 to a point adjacent the rear terminal of tubular member 28, where it is fixed to a gate valve assembly 48. (See FIG. 7.) Gate valve assembly 48 includes an arm 49 fixed at 50 to push rod 46. The lower terminal of arm 49 issues into a fan-shaped gate 51. As shown in FIG. 7, arm 49 is pivoted at 52 to a fixed part of the surfboard at a point in spaced relation to fixed connection 50. Push rod 46 is additionally connected by a linking rod 53 to a foot control bar 54 at a point beyond water gate valve assembly 48. Foot bar 54 is pivoted at 55 intermediate its length and the free terminal thereof is connected to a forwardly extending link rod 53', which is, in turn, connected to a second water gate valve assembly 48', similar to assembly 48, but operating in reverse direction thereto. Like parts of assembly 48' are identified by like, primed numbers. In the inoperative position, fan-shaped gate 51 is adapted for engagement with the inner openings of a port discharge tube 56 and port discharge jet tube 57, respectively. Port tube 56 extends laterally to expel water from the stern of the hull, as indicated at 58. Port jet tube 57 extends forwardly of the surfboard through air tank 23 to expel water through a side bow opening 59. The starboard side of the surfboard is provided with like starboard tube and starboard jet tube, identified by like, primed numbers.

It will be noted that when in inoperative position, fan-shaped gates 51, 51' close port and starboard tubes 56, 56' and port and starboard jet tubes 57, 57'. When operated, however, either by manipulation of hand hold 43 or foot bar 54, gates 51, 51' are in selective engagement with the inner openings of tubes 56, 56' and 57, 57'. It is to be further noted that when fan-shaped gate 51 is in operative engagement with the opening of port tube 56, fan-shaped gate 51' is in operative engagement with starboard jet tube 57' and vice versa, by virtue of the particular arrangement of the parts of the present invention. When water gate valve assemblies 48 and 48' are actuated to open either port or starboard discharge jet tubes 51 or 51', water is forced under pressure through water channel tube 28' by propeller 42 into jet tubes 57 or 57'. Water is forced into port and starboard discharge tubes 56, 56' in a similar manner. Thus when water is expelled through port jet tube 57 and starboard tube 56', the surfboard pivots about an imaginary swivel point intermediate the length of the surfboard to product a starboard turn. In like manner when water is expelled through port tube 56 and starboard jet tube 57' a port turn is effected.

It is also within the contemplation of the present invention to provide control means for opening and closing bow water channel gate and diving rudder 29 and for opening and closing stern water gate 33 and actuating stern diving rudders 31, 31'. The controls for water channel gate and diving rudder 29 are hand operated and are shown to advantage in FIGS. 3, 12, 14, 15 and 16, the hand control mechanism being generally designated 60. Mechanism 60 includes a horizontal hand hold 61 which is above and in spaced relation to deck 21 one terminal of which issues into a downwardly directed arm 62 which passes through an opening in the deck whereupon it is bent inwardly at right angles to form a horizontal portion 63 which is supported by and extends through a suitable bearing member 64. Horizontal portion 63 is rotatable in bearing 64 in response to fore and aft movement of hand hold 61. The free terminal of horizontal portion 63 is bent downwardly at 65 to provide a link, the lower terminal of which is pivoted at 66 to a connecting arm 67. Pivot member 66 extends through connecting arm 67 where it engages a second link 68, the upper terminal of which is bent at right angles to form a horizontal portion 69 rotatably mounted in a suitable bearing 70 similar to bearing 64. The lower terminal of operating arm 67 is pivoted at 73 to a suitable pivot connection 74 which is strategically mounted on one face of elevating and diving rudder 29. Therefore when hand hold 61 is in the neutral position shown in FIG. 14, the water channel 27 is open for the admission of water to tubular member 28. However when hand hold 61 is pulled back by the rider as shown in FIG. 15, the arrangement of pivoted connecting arms and operating arms lowers gate and diving rudder 29 to the diving position. When hand hold 61 is pushed forward to the position shown in dotted lines in FIG. 15, arm 65 and 67 operate to raise diving rudder 29 to a point where water channel 27 is only partially open. This is the rudder position for surfacing after the craft has been submerged. Water channel 27 is closed to prevent the entry of water therein by moving hand hold 61 forward as far as possible, thereby raising rudder 29 to the closed position shown in FIG. 16.

The stern water channel door and diving rudder control assembly is generally designated 75. As shown to advantage in FIGS. 1, 2, 4, 9, 10 and 11, assembly 75 includes a pair of foot pedals 76 and 76' which extend upwardly through openings 77, 77' in deck 21 near the aft end thereof. Foot pedals 76 and 76' are suitably mounted on pivot bar 34 which extends transversely of the surfboard beneath deck 21 and is rotatably mounted at intervals in bearings 78. Pedals 76 and 76' are biased in a forward direction by suitable coil springs 79 and 79' which are carried by the hull. Levers 80, 80' are connected to and movable with the lower terminals of foot pedals 76, 76' the lower central sections of which levers are provided with elongated central slots 81, 81'. Connecting arms 82, 82' are provided with pivot pins 83, 83' adapted to be received by and moved within elongated slots 81, 81'. The lower terminals of connecting arms 82, 82' are pivoted to suitable pivot members 84, 84' which are mounted on stern diving rudders 31 and 31' near the aft end thereof. The forward end of rudders 31 and 31' are fixed to transverse rod 32 which are rotatably mounted at intervals in bearings 85.

With the water craft of the present invention, steering is accomplished by control of transverse jets of water selectively fed through water discharge tubes 56, 56' and 57, 57'. Pitch control if provided by bow and stern diving planes 29 and 31 operated by a hand control 61 and foot pedals 76, 76', respectively.

In use, the rider lies prone on deck 21 of the surfboard and grasps hand hold 43 with his left hand and hand hold 61 with his right hand. The left and right foot of the rider are engageable with foot pedals 76 and 76', respectively. Engine 36 is next started with hand hold 61 in the forward position shown in FIG. 16. After the engine is started, hand hold 61 is moved rearwardly of the craft to open water channel inlet 27 any desired amount to the maximum shown in FIG. 14, at which time hand hold 61 is in the intermeidate or neutral position.

Correspondingly, foot pedals 76 and 76' are urged rearwardly against the tension of springs 79 and 79' to raise stern water channel door 33 upwardly to permit passage of water in tubular member 28 to be expelled from the rear of the craft. Channel water door 33 may be opened any desired amount. As shown in FIG. 10, rudders 31, 31' do not move upon initial depressing of pedals 76, 76', by virtue of the dwell period effected by movement of pin 83 in slot 81.

A salient feature of the present invention is that the speed of engine 36 does not vary nor does the rotational speed of propeller 42 vary as is conventional with other water craft to effect speed changes. With the device of the present invention, the speed of the surfboard through the water is determined by the amount of water which is let out of water channel 27 and expelled under pressure from the aft end through water channel tube 28'. Speed is therefore controlled by manipulation of hand hold 61 and the operation of foot pedals 76 and 76'.

Hand hold 61 and foot pedals 76 and 76' additionally control the diving of the surfboard through waves of water, particularly, although it is deemed to be within the contemplation of the present invention that such mechanism can be employed for diving below the surface of still water as well. For diving, hand control 61 is moved rearwardly to the position shown in FIG. 15 at which time combination water channel door and rudder 29 is pivoted into the diving position illustrated. Also, as shown in FIG. 11, upon urging of foot pedals 76 and 76' to their rearmost extent, rudders 31, 31' are pivoted about pivot rod 34 to the diving position illustrated.

The direction of movement of the surfboard of the present invention is controlled either by manipulation of hand hold 43 or by operation of foot bar 54. A port turn is effected by moving handle 43 forward thereby effecting a forward longitudinal movement of push rod 46. This results in a forward movement of arm 49 about pivot point 52 to effect a rearward movement of fan-shaped gate 51 thereby opening port jet tube 57. Linking rod 53 is also moved longitudinally in a forward direction in response to a corresponding movement of push rod 46 and, by virtue of pivotal connection 55 centrally of foot bar 54, linking rod 53', is moved in the opposite or rearward direction. This in turn results in a rearward movement of arm 49' about pivot 52'. Fan-shaped gate 51' is moved forwardly and upwardly in an arc to open port tube 56'. Water is thereby expelled through port jet discharge tube 57 at 59 and through starboard discharge tube 56' at 58'. A starboard turn is effected by a rearward movement of hand hold 43 to effect movement of the operating mechanism in the reverse direction set out above in connection with the port turn. This in turn opens port jet discharge tube 57 to expel water through opening 59 and open starboard jet discharge tube 57' to expel water through opening 59'.

The surfboard of the present invention is preferably constructed of a lightweight metal. Air tanks 23, 23' and 28 lend stability and buoyancy to the craft. Sturdy construction and buoyancy enable the present device to be used in fresh or salt water and in water which is smooth, or rough, or in ocean surf. The surfboard lends itself to use wherever a small, silent craft is desirable.

While I have herein shown and described a preferred embodiment of my invention, it is nevertheless to be understood that various changes may be made therein without departing from the spirit and scope of the appended claims.

What is claimed is:

1. A water craft including a body section comprising a supporting surface, a water channel below said supporting surface extending longitudinally of the body section, power means in said water channel for forcing water rearwardly through said water channel, diving planes pivoted to the fore and aft terminals of said water channel, and means for selectively raising said planes to close the fore and aft ends of the water channel and control the passage of water therethrough.

2. The water craft of claim 1 with the addition of jet discharge tubes extending laterally through said body section on both sides of said water channel, and means for selectively opening said discharge tubes to permit the lateral flow of water therethrough from said water channel, thereby effecting change in direction of movement of the water craft.

3. A water craft including a body section comprising a supporting surface, a water channel below said supporting surface extending longitudinally of the body section, stabilizing members on each side of said water channel, power means in said water channel for forcing water rearwardly through said water channel, water discharge tubes extending laterally through each stabilizing member from said water channel near the aft end of the latter, one of said tubes extending laterally of the water craft, the other of said tubes extending forwardly through said stabilizing member to expel water through a side bow opening, and means for selectively opening said discharge tubes to effect change in direction of movement of the water craft.

4. The water craft of claim 3 wherein said means includes gates in operative engagement with said water discharge tubes, and foot pedals connected to said gates for moving the latter, to selectively open said water discharge tubes and permit passage of water therethrough.

5. A water craft including a body section comprising a supporting surface, a water channel below said supporting surface extending longitudinally of the body section, stabilizing members on each side of said water channel, power means in said water channel for forcing water rearwardly through said water channel, a diving rudder pivoted to the leading edge of said water channel, means for operating said diving rudder to selectively raise the latter to close the water channel and prevent the entry of water therein, a channel door pivotally connected to the aft edge of said water channel, means for selectively opening and closing said channel door, water discharge tubes extending transversely through said stabilizing members from each side of said water channel, said tubes being located adjacent the aft end of said water channel, one of said water discharge tubes extending laterally to expel water from the stern, the other of said tubes extending forwardly through said stabilizing members, to expel water through a side bow opening, gate means in said water channel in operative engagement with said water discharge tubes, and means for selectively opening and closing said water discharge tubes to control the turning of the water craft.

References Cited in the file of this patent

UNITED STATES PATENTS

| | | |
|---|---|---|
| 2,276,193 | Hanley | Mar. 10, 1942 |
| 2,369,996 | Baker | Feb. 20, 1945 |
| 2,722,021 | Keogh-Dwyer | Nov. 1, 1955 |
| 2,948,247 | Rebikoff | Aug. 9, 1960 |

FOREIGN PATENTS

| | | |
|---|---|---|
| 522,187 | Great Britain | July 11, 1940 |
| 746,383 | Great Britain | Mar. 14, 1956 |